__United States Patent Office__  3,146,056
Patented Aug. 25, 1964

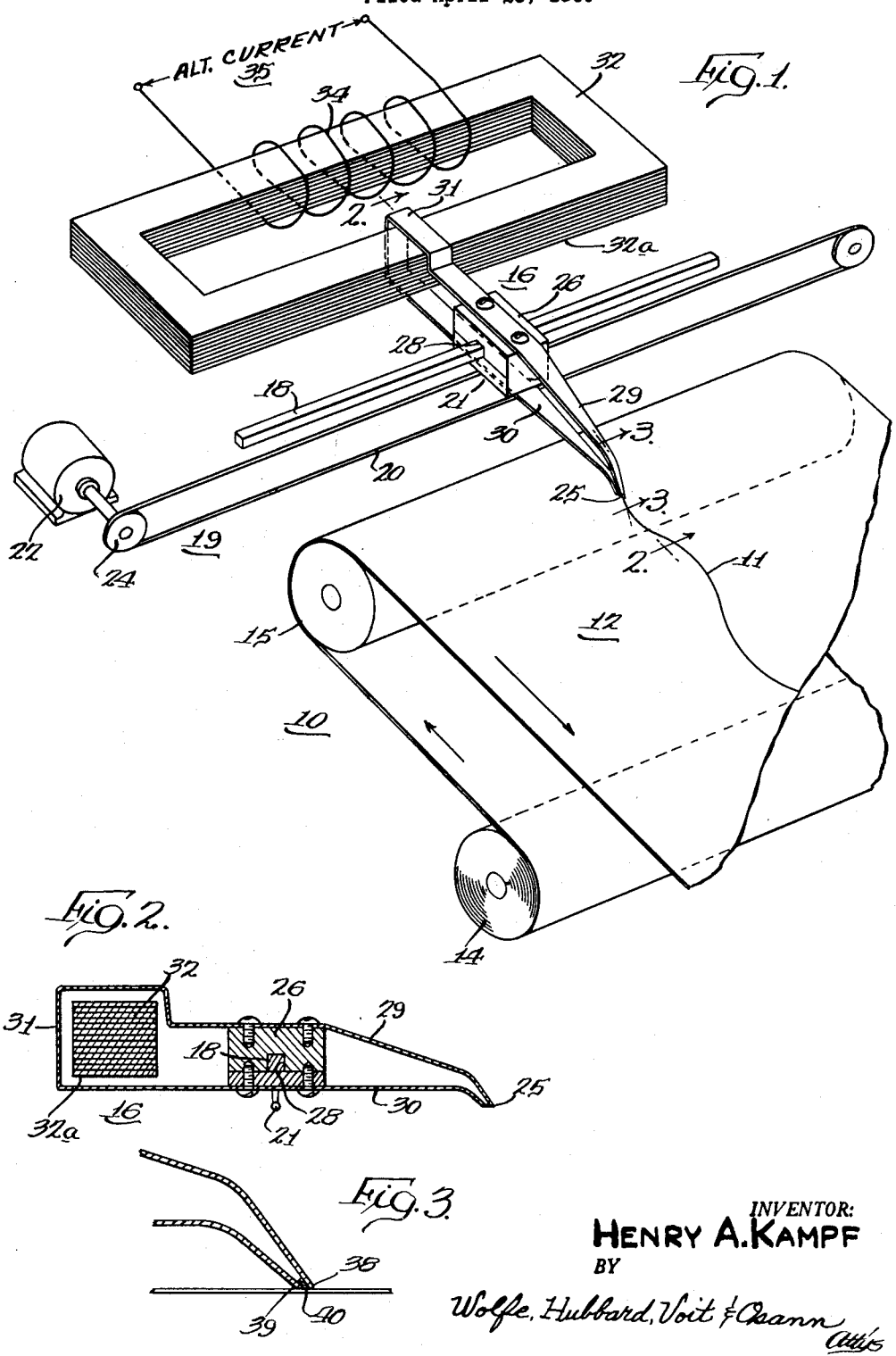

3,146,056
INDUCTIVELY ENERGIZED RECORDING STYLUS
Henry A. Kampf, 4835 Prospect, Downers Grove, Ill.
Filed Apr. 25, 1960, Ser. No. 24,397
5 Claims. (Cl. 346—76)

This invention relates in general to recording devices or pens and in particular to such devices which are electrically energized to apply traces or indicia to a record surface.

It is the general aim of the invention to provide an electrically energized movable tracer or stylus which eliminates any need for sliding electrical contacts or flexible connecting wires, thus minimizing friction loading on and affording faster movements of the stylus with less driving power.

Further, it is an object of the invention to provide such a tracer or stylus adapted to affect a heat sensitive or voltage sensitive record surface as the tracer and record surface move relative to each other.

Also, an object of the invention is to provide an economical and simple recording device of greatly improved accuracy for applying indicia to a record surface.

Other objects and advantages of the invention will become apparent upon reading the following detailed description with reference to the drawing, in which:

FIGURE 1 is a perspective view of a recording device embodying the present invention;

FIG. 2 is a detail view of the tracer or stylus assembly taken in section substantially along line 2—2 in FIG. 1; and FIG. 3 is similar to FIG. 2, but illustrates a modified stylus assembly for applying traces to a voltage sensitive surface.

While the invention will be described in connection with specific preferred embodiments, it will be understood that I do not intend to limit the invention to such specific embodiments. On the contrary, it is intended here to cover all alternatives, modifications and equivalents falling within the spirit and scope of the invention as defined by the appended claims.

Turning first to FIG. 1, the exemplary recording device 10 there shown is intended to apply indicia in the form of a trace 11 to the sensitive surface of a record 12. The record 12 is illustrated as a strip of paper treated with a material which is heat sensitive, i.e., changes color or appearance when subjected to elevated temperatures. The record may of course be made of other flexible material such as plastic or fabric, or it could be formed as a sheet or cylinder of either flexible or inflexible material having a heat sensitive surface. To afford movement of the sensitive paper 12 longitudinally, it is drawn from a supply spool 14 by rotation of a feed roller 15. This rotation is effected (by means not shown) at a speed determined by one of the parameters of the data being recorded. The sensitive paper may, for example, be fed at a fixed rate when measured variations in temperature, pressures, voltages or the like are to be recorded or plotted against time.

The stylus assembly 16 is slidably supported by a guide bar 18 and is adapted for movement transversely of the record 12. As has been shown, controlled motion of the assembly 16 is produced by a drive string assembly 19 composed of a string 20 attached to the stylus assembly 16 at point 21 and driven by a servomotor 22 through a pulley 24. The motor is energized by a servo control circuit (not shown) to thereby position the stylus transversely of the record in a manner well known in the art. This position is varied substantially instantaneously according to the value of a variable condition being measured. For example, variable conditions such as temperatures, pressures, voltages or the like may be sensed to cause corresponding movement and positioning of the stylus tip 25 across the record 12.

In accordance with the present invention, the stylus assembly 16 is constructed to be electrically excited or activated so that it will affect the adjacent record surface and apply a trace thereto. The electrical energy for the stylus is supplied by creating an alternating magnetic field and providing for inductive coupling between the field and the stylus as the latter moves over its entire range of travel.

As illustrated by way of example in FIGS. 1 and 2, the stylus assembly includes an insulating block 26 having a passage 28 through which the guide bar 18 extends. Fixed to the upper and lower surfaces of the block 26 are flat, ribbon-like conductors 29 and 30 which taper in width and turn downwardly to a point where they are joined by a bead of high resistance metal to form a narrow stylus tip 25. The resistance of the narrow junction or tip 25 is relatively high as compared to the wider conductors 29 and 30, so that current flowing through the tip heats the latter to make it create a trace or mark 11 on the adjacent heat-sensitive surface of the record.

To supply current through the tip 25, the ribbon conductors 29 and 30 are extended to the rear of the block 26 and formed into a closed loop 31. In the preferred construction, the conductors 29 and 30, the tip 25, and the loop 31 are all formed from a single piece of flat metal stock. The loop 31 is arranged to embrace and be inductively coupled with an alternating magnetic field as the stylus assembly is moved transversely of the record 12. For this purpose, an elongated core of laminated ferromagnetic material is disposed adjacent the path of the stylus assembly, the loop 31 embracing but preferably not touching, one leg 32a of core 32. An input coil 34 wound around the core 32 and adapted for connection to a conventional alternating voltage source 35 thus sets up an alternating magnetic field within the core 32 which induces current in the closed circuit formed by the loop 31, the conductors 29 and 30 and the tip 25. This exciting current heats the tip 25 so that as the latter moves relative to the heat sensitive record 12, the indicia or trace 11 is created thereon. It is clear that energy is provided at the tip 25 from core 32 by a magnetic, non-mechanical coupling of loop 31 with core 32.

In some instances it may be desirable to form the loop 31 with a plurality of turns which embrace the core leg 32a, the conductors 29 and 30 being connected to the ends of the series-connected turns to form a closed series circuit. This will, of course, make the voltage induced in the series circuit greater for a given strength of the alternating magnetic field in the core 32.

The results obtained from a recording device using the disclosed structure are accurate. There are no conductors either slidably or permanently fixed to the stylus assembly to cause loading or inaccuracies due either to frictional drag or conductor flexing. The energy is supplied to the stylus tip 25 through conductors 29 and 30 magnetically coupled to the core leg 32a, thus eliminating any physical contact or connection for the transfer of energy.

Any flux leakage which might adversely change the magnitude of current induced in the loop 31 as the assembly moves to various positions can be compensated for by constructing the leg 32a with a nonuniform cross sectional area. By changing the core cross sectional area, the effective magnetic coupling between the loop 31 and the core 32 is changed. If there is excessive flux leakage at any point, particularly near the ends of the range of stylus travel, the core cross sectional area would be increased at this position enough to compensate for the flux leakage.

To explain a typical operational cycle of the recording device 10, let it be assumed that a plot of temperature variations with time is desired. Signals would be fed from a thermocouple, for example, to the servo control circuit (not shown) for the motor 22, and the latter will thus move the stylus tip 25 to a unique position for each value of the sensed voltage produced by the thermocouple. As any change in temperature is sensed by the thermocouple, the motor would drive the stylus tip 25 to a new position. The stylus assembly 16 would be moved along the guide bar 18 and be constantly energized to heat the tip 25 through coupling to the magnetic field set up in the core 32. As mentioned, there is no physical connection between the stylus assembly conductors 30 and 31 and the core leg 32a or the voltage source 35 to impose a drag or load on the assembly 16. For a given power rating of the motor 22, the stylus assembly can be accelerated and moved faster than if such loading were present, and the assembly 16 will thus respond or follow promptly all variations in the sensed temperature. The record 12 will, of course, be moved at a rate proportional to the elapsing time so that the end product is a plot of temperature against time.

The explanation above has been directed to tracing indicia upon heat sensitive paper. However, the present invention also finds advantageous application in applying traces to voltage sensitive record surfaces. The same electro magnetic coupling may be used to electrically excite the stylus assembly 16. FIG. 3 shows the construction of a stylus adapted to trace indicia on such a voltage sensitive surface.

The stylus assembly 16 shown in FIG. 3 is similar to that described in connection with FIGS. 1 and 2, but differs in that the two points 38 and 39 of the ribbon conductors 29 and 30 are insulated from each other by a wafer 40 of nonconducting material. The voltage induced in the loop 31, 29, 30 will appear as a potential difference across the gap between the two points 38 and 39, thus setting up an electric field which links with and visibly affects the adjacent sensitive paper. There will be a very small amount of current flow in the conductors 29 and 30, this being due to minute current flow induced in the voltage sensitive surface. Because it is the voltage or electric field across the stylus tip, rather than current flow through the tip, which affects the record surface, it will often be desirable to increase the magnitude of this voltage by employing a loop 31 having a plurality of turns, as previously described.

I claim as my invention:

1. In a recording device for drawing a trace on a heat sensitive record surface, the combination of means adapted for connection to an A.-C. source for creating an electromagnetic field, a stylus having a tip movable along a predetermined path adjacent to said record surface and heated by current therethrough to affect the heat sensitive surface, means movable with said stylus and having a magnetic, non-mechanical coupling throughout movement along said path with said electromagnetic field for creating exciting current flow through said stylus tip.

2. In a recording device for drawing a trace on a heat sensitive record surface, the combination of an elongated ferromagnetic core, means connectable to an A.-C. source for creating a magnetic field in said core, a stylus assembly having a conductor formed in a closed loop which includes a tip, guide means for supporting said assembly for movement with said tip disposed adjacent the record surface, and said loop being disposed about said core and having a magnetic, non-mechanical coupling therewith for creating heating current flow through said stylus tip as the assembly moves relative to the record surface.

3. In a recording device for drawing a trace on a voltage sensitive surface, the combination of means energizable from an alternating voltage source for creating an alternating magnetic field, a stylus movable along a predetermined path adjacent the surface and responsive to electrical excitation for affecting the voltage sensitive surface, and means movable with said stylus and having a magnetic, non-mechanical coupling throughout movement along said path with said electromagnetic field for inducing a voltage in said stylus.

4. In a recording device for drawing a trace on a voltage sensitive record surface, the combination of an elongated ferromagnetic core, means connectable to an A.-C. source for creating a magnetic field in said core, a stylus having a conductor formed in a loop with tips separated by an insulating medium, guide means for supporting said assembly for movement with said tips adjacent to said record surface, said loop being disposed to embrace said core and having a magnetic, non-mechanical coupling therewith creating an electric field between said tips to create a trace on the surface.

5. In a recording device for drawing a trace on a sensitive surface, the combination of first means energizable from an alternating voltage source for creating an alternating magnetic field, a stylus movable along a predetermined path adjacent the surface and responsive to electrical excitation for affecting the sensitive surface, and second means movable with said stylus and coupled with said first means by only an inductive coupling with said field for electrically exciting said stylus throughout movement along said path so as to permit relative movement between said stylus and said first means with freedom from mechanical retarding forces.

References Cited in the file of this patent
UNITED STATES PATENTS

| | | |
|---|---|---|
| 2,641,457 | Carleton | June 9, 1953 |
| 2,644,738 | Gardner | July 7, 1953 |
| 2,647,033 | Faus | July 28, 1953 |
| 2,683,111 | Greig | July 6, 1954 |
| 2,715,669 | Dicke | Aug. 16, 1955 |
| 2,836,479 | Traub et al. | May 27, 1958 |